July 2, 1968

K. E. MASSENGALE 3,391,259

ELECTRICAL SWITCH

Filed April 24, 1967

INVENTOR.
KENNETH E. MASSENGALE
BY
Woodard, Weikart, Emhardt & Naughton
Attorneys

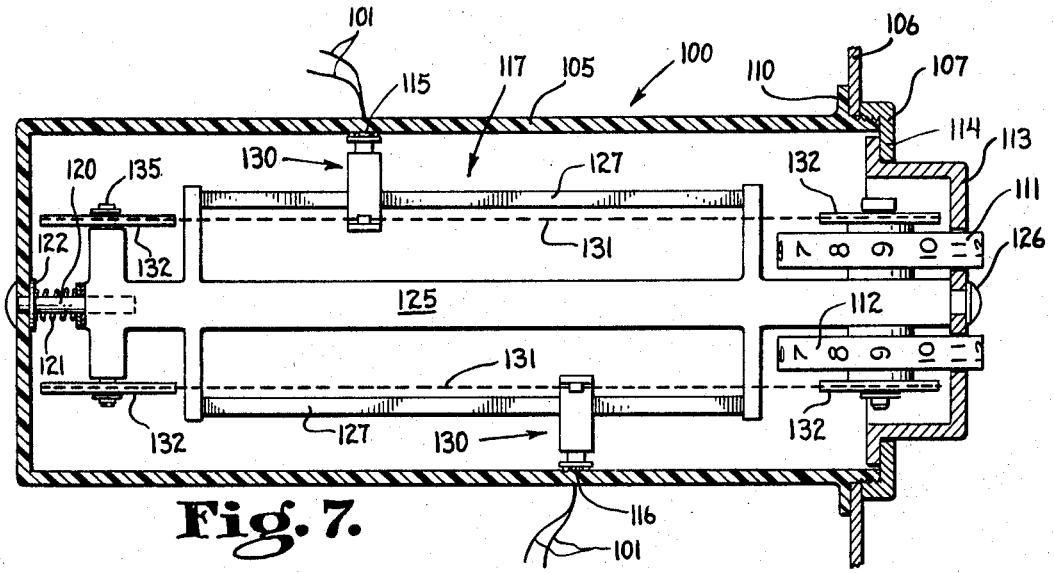
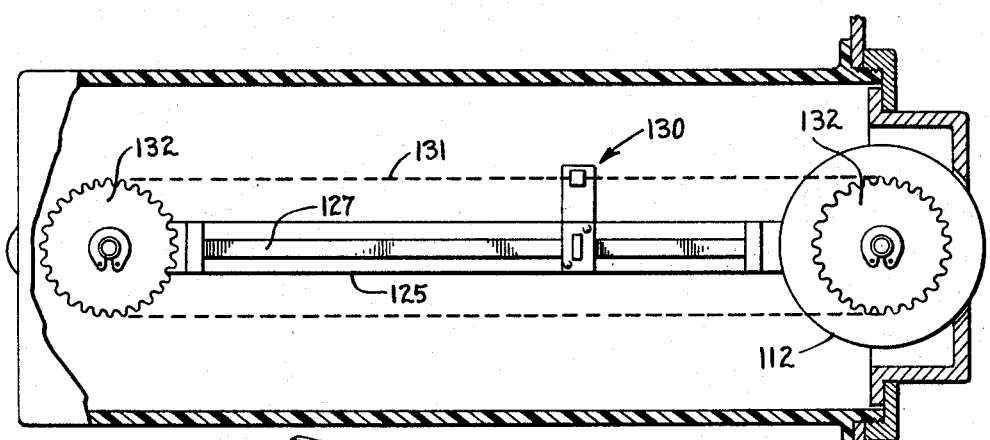
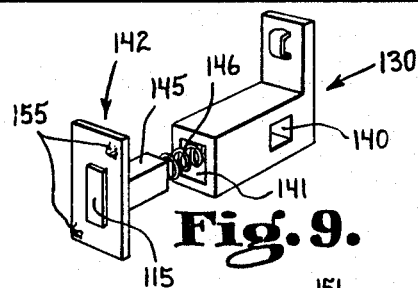
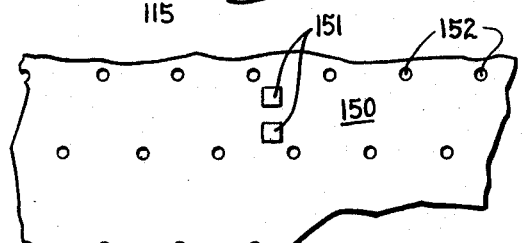
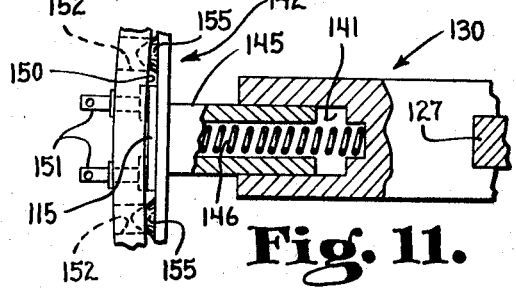

United States Patent Office 3,391,259
Patented July 2, 1968

3,391,259
ELECTRICAL SWITCH
Kenneth E. Massengale, 3464 Garden Ave.,
Indianapolis, Ind. 46222
Filed Apr. 24, 1967, Ser. No. 633,152
6 Claims. (Cl. 200—43)

ABSTRACT OF THE DISCLOSURE

An electrical combination switch mounted on the dashboard of an automobile in series with the conventional key operated ignition switch. One such combination switch includes a pair of coaxial rotors, both of which carry contacts for bridging contacts on the base of the switch to make a circuit through the switch. Another such combination switch includes a cylinder within which is a rotatable contact-carrying assembly, the contacts of which are moved longitudinally of the cylinder by chain and sprocket assemblies.

Background of the invention

*Field of the invention.*—This invention relates to electrical combination switches and automobile electrical systems.

*Description of the prior art.*—One of the most common crimes committed in this country at the present time is the stealing of automobiles. Frequently, this happens as a result of the temptation provided by automobile owners leaving their keys in the ignition. In other cases such stealing is carried out by the jumping of the ignition switch with an electric wire or jumper cable. Consequently, there exists a need for an improved arrangement or procedure for preventing the theft of automobiles whether the keys are left in the ignition or not.

Summary of the invention

One embodiment of this invention might include in an automobile electrical system including a key operated switch, a battery connected in series with said switch and an automobile ignition system in series with said battery and switch; the improvement which comprises an electrical combination switch including a base, a first pair of contacts mounted on said base and in series with said key operated switch, said battery and said ignition system, a first movable contact movably mounted on said base and movable to a plurality of positions in one of which said first movable contact bridges said first pair of contacts, means for hiding the position of said first movable contact, and a dial mechanically coupled to said first movable contact for positioning said first movable contact.

One object of this invention is to provide an improved automobile electrical system.

Another object of this invention is to provide an improved electrical combination switch.

Still another object of this invention is to provide a relatively inexpensive and easily constructed electrical combination switch.

A further object of this invention is to provide an electrical combination switch which cannot be easily jumped or tampered with.

Brief description of the drawing

FIG. 7 is a section taken along the axis of an alternative embodiment of the electrical switch of the present invention.

FIG. 8 is a section taken along the line 8—8 of FIG. 7.

FIG. 9 is an enlarged perspective view of a contact-carrying carriage forming a part of the structure of FIGS. 7 and 8.

FIG. 10 is an enlarged fragmentary view of the inside surface of a cylinder forming a part of the structure of FIGS. 7 and 8.

FIG. 11 is an enlarged fragmentary section showing a portion of the structure illustrated in FIG. 7.

Description of the preferred embodiments

Figure 2:
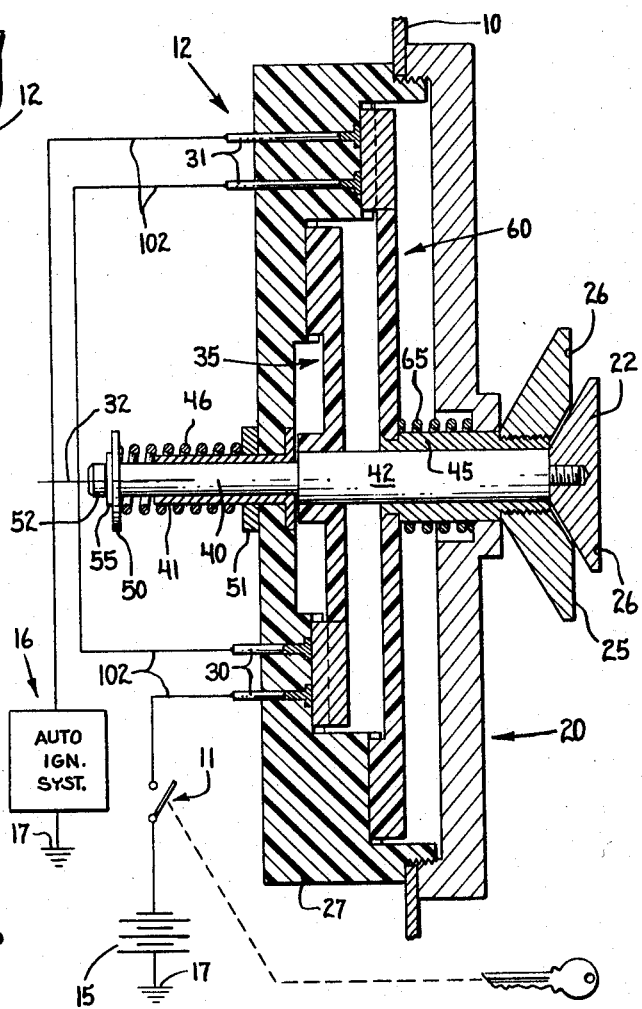
FIG. 2 is an enlarged vertical section taken along the line 2—2 of FIG. 1 in the direction of the arrows and also showing in electrical schematic form the automobile electrical system of the present invention.
Figure 4:
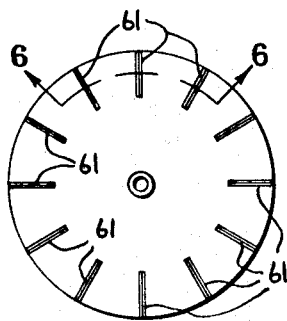
FIG. 4 is a front elevation of a rotor forming a part of the switch of FIGS. 1 and 2.

Referring now more particularly to the drawings, there is illustrated a dashboard 10 of an automobile having a conventional ignition lock 11 and an electrical combination switch 12. The automobile electrical circuit is illustrated in FIG. 2 as including the battery 15 which is connected in series with the ignition switch 11 and the electrical combination switch 12 and in turn with the automobile ignition system 16. The series circuit is closed through the ground connections 17.

Figure 1:
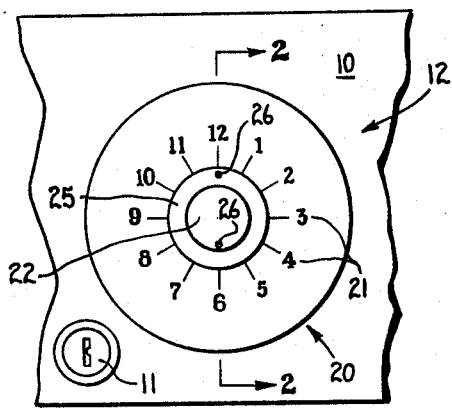
FIG. 1 is a front elevation of a dashboard of an automobile showing the electrical combination switch of the present invention.

As shown in FIG. 1, the electrical combination switch 12 includes an opaque cover 20 which has suitable indicia 21 inscribed thereon which in the present example comprises the numerals one through twelve arranged as in the conventional clock. Also visible in FIG. 1 are opaque dials 22 and 25, each of which has a pointer or dot 26 thereon to indicate the rotary position of the dial.

Figure 5:
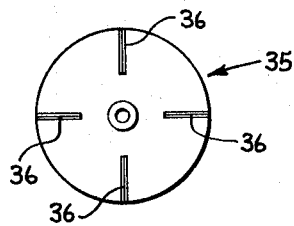
FIG. 5 is a front elevation of a further rotor forming a part of the switch of FIGS. 1 and 2.

Referring to FIG. 2, the electrical combination switch 12 further includes a base 27 which has a first pair of contacts 30 mounted therein and a second pair of contacts 31 mounted therein. The first pair of contacts 30 are mounted closer to the axis 32 of the base than are the second pair of contacts 31 so that the first pair of contacts 30 are covered by an electrically nonconductive rotor 35 arranged coaxially with the base 27. FIG. 5 shows the rotor 35 as viewed from the left side of FIG. 2 and illustrates projections 36 on the rotor, one of said projections 36 being an electrical contact or being electrically conductive so that when that projection 36 covers and engages the contacts 30 an electrical circuit is made between the contacts 30.

Figure 3:
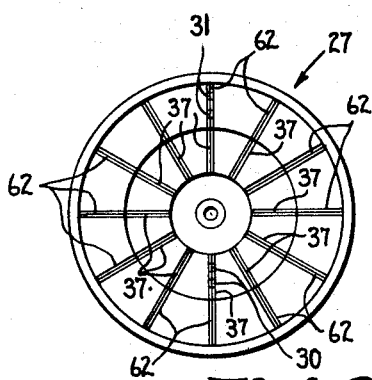
FIG. 3 is a front elevation of a base forming a part of the electrical combination switch of FIGS. 1 and 2.

As shown in FIG. 3 which is a view of the base 27 taken from the right side of FIG. 2, the base 27 has twelve recesses 37 in only one of which the contacts 30 are located. Thus, the rotor 35 can be rotated to twelve "snap in" positions but only one of those positions brings the contacts 30 into an electrical connection.

The rotor 35 is mounted upon a shaft 40 which is rotatably received within a bearing 41 mounted upon the base 27. The shaft 40 has an enlarged portion 42 which is rotatable within an annular member 45 for which the cover 20 acts as a bearing. The rotor 35 is maintained in yieldable contact with the base 27 by means of a compression spring 46 which acts between a washer 50 and a further washer 51 which bears against the base 27. The washer 50 is fixed to the distal end of the shaft 40 by means of a screw 52 and a further washer 55. Thus, the spring 46 acts through the shaft 40 between the base 27 and the rotor 35 to urge the rotor into contact with the base and with the contacts 30. However, only when the elecrically conductive contact 36 is in contact with the contacts 30 is the circuit made between the contacts 30.

Figure 6:
FIG. 6 is an enlarged section taken along the line 6—6 of FIG. 4 in the direction of the arrows.

Fixedly mouned upon the annular member 45 is a second electrically nonconductive rotor 60 which has a plurality of projections 61. Only one of the projections 61, the central projection 61 illustrated in FIG. 6, is electrically conductive so that the electrical circuit is not made between the contacts 31 except when the central contact 61 of FIG. 6 is received within the uppermost recess 62 illustrated in FIG. 3. The rotor 60 is spring biased against the base 27 by means of a compression spring 65 which acts between the cover 20 and the rotor 60. The outer dial 22 is used to turn the outer rotor 60 while the dial 25 is used to turn the inner rotor 35. When the dial 25 is pulled toward the person operating the dial, the turning of the dial 25 also turns the dial 22 so as to move the two electrically conductive projections 61 and 36 of the electrical contacts 31 and 30, respectively, which close the switch. This arrangement provides a fast way of moving the switch away from its "switch-closed" combination.

Referring now to FIGS. 7–11, there is illustrated an electrical switch 100 which is usable in the same circuit as illustrated in FIG. 2. Thus, there are four wires 101 leading away from the switch 100 and these four wires 101 correspond to the wires 102 of FIG. 2. Thus, two of the wires 101 are connected together while the other two wires, one from each of the sides of the switch 100, form the input wires to the switch. The switch 100 includes a cylinder 105 which is fixed to the dashboard 106 by an opaque threaded annular member 107. As can be seen from FIGS. 7 and 8, the cylinder 105 has a flange 110 which abuts against the rear surface of the dashboard 106 for mounting the cylinder. If desired to minimize tampering, the annular member 107 and the cover 20 of FIG. 2 can be welded to the dashboard 106.

The electrical combination switch of FIGS. 7–11 includes three dials instead of the two dials illustrated in connection with FIGS. 1–6. The three dials of the present embodiment are the dials 111, 112 and the opaque cover 113 which can carry a suitable pointer or dot for indication of numerals inscribed on the face 114 of the annular member 107. Thus, not only must movable contacts 115 and 116 be moved to the proper position in a front to rear direction but they also must be rotated to a proper rotary position by rotation of the cover 113.

The switch 100 includes a rotatable assembly 117 which includes and is mounted by the cover 113 for rotation within the cylinder 105 and which is also mounted for rotation within the cylinder by a shouldered screw 120. Received upon the shouldered screw 120 is a compression spring 121 which acts between a washer 122 and the main body 125 of the rotatable assembly 117. The spring 121 urges the cover 113 against the annular member 107 so as to resiliently mount for rotation the rotatable assembly 117. The cover 113 is fixed to the main body 125 of the rotatable assembly by means of a screw 126.

The main body 125 includes guide rods 127 of square cross section upon which contact-carrying carriages 130 are mounted for front to rear movement. Each of the carriages 130 is moved by a respective chain 131, each of which is received upon and meshes with a pair of sprockets 132. Each of the sprockets 132 at the rear portion of the switch is independently rotatably mounted upon the shaft 135 fixed to the main body 125 of the rotatable assembly 117. Each of the sprockets 132 at the forward portion of the switch is fixed for rotation with a respective one of the dials 111 and 112. Thus, when the dial 111 is rotated, the carriage 130 carrying the contact 115 is moved forwardly or rearwardly and when the dial 112 is rotated, the carriage 130 carrying the contact 116 is moved forwardly or rearwardly.

Referring to FIG. 9, a respective one of the carriages 130 is illustrated as including the square shaped cross sectional aperture 140 which is complementary in configuration to the square shaped cross sectional guide rods 127 as well as a further square shaped or rectangular shaped cross sectional recess 141 which slidably receives an electrically nonconductive contact mounting member 142. As illustrated, the contact mounting member 142 has a projection 145 which is complementary in configuration to the recess 141 and which extends into the recess. A compression spring 146 acts between the carriage 130 and the contact carrying member 142 to yieldably urge the contact 115 outwardly against the inner surface 150 of the cylinder 105 which is illustrated in FIG. 10. As shown in FIG. 10, a pair of contacts 151 which correspond to the contacts 30 or 31 of FIG. 2 are located where they can be bridged by the contact 115 when the carriage 130 is moved by a suitable setting of the dial 111 and the dial 113. The inner surface 150 of the cylinder 105 has a plurality of recesses 152 therein which are engaged by the projections or nipples 155 on the member 142 to provide a plurality of "snapped-into" positions for the contact 115 and the dial 111 as well as the dial 113.

The dial 112 also functions similarly with the contact carrying carriage 130 for the contact 116.

It will be evident from the above description that the present invention provides an improved automobile electrical system. It should be mentioned that the combination switch of FIGS. 1–6 or the combination switch of FIGS. 7–11 can be positioned where the clock is positioned in the usual automobile dashboard, that is on the right side of the dashboard spaced away from the ignition lock 11 so as to make difficult bridging of the circuit by a jumper wire or cable and, thus, to make difficult the stealing of the automobile. Also, preferably the cylinder 105 and the points at which the wires 101 enter into the cylinder are hidden and encased by a further cylinder (not shown). It will also be evident that the present invention provides an improved electrical combination switch which is relatively inexpensive and easily constructed.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An electrical combination switch comprisnig a base, a first pair of contacts mounted on said base, a first movable contact movably mounted on said base and movable to a plurality of positions in one of which said first movable contact bridges said first pair of contacts, means for hiding the position of said first movable contact, a first dial mechanically coupled to said first movable contact for positioning said first movable contact, a second pair of contacts mounted in said base and connected in series with said first pair of contacts, a second movable contact movably mounted on said base and movable to a plurality of positions in one of which said second movable contact bridges said second pair of contacts, said means for also hiding the position of said second movable contact, a second dial mechanically coupled to said second movable contact for positioning said second movable contact, a rotor rotatably mounted on said base and having said first contact mounted thereon, and first spring means acting between said base and said first rotor to urge said rotor against said base, said base and rotor having complementary projections and recesses spaced at regular intervals around the axis of said rotor and adapted to snap into registry each time said first movable contact moves into another of said plurality of positions.

2. The switch of claim 1 additionally comprising a second rotor rotatably mounetd on said first rotor coaxially therewith and having said second contact mounted thereon, second spring means acting between said base and said second rotor to urge said second rotor against said base, said base and second rotor having complementary projections and recesses spaced at regular intervals around the axis of said second rotor and adapted to snap into registry each time said second movable contact moves into another of said plurality of positions.

3. The switch of claim 2 wherein said rotors are cupped within said base, a cover for said base, said cover serving as a bearing for said first rotor, said cover having indicia inscribed thereon against which said dials register, said second dial being located outside of said cover and fixed to said second rotor, said first dial being located outside of said cover and fixed to said first rotor and cupped within said second dial.

4. An electrical combination switch comprising a base, a first pair of contacts mounted on said base, a first movable contact movably mounted on said base and movable to a plurality of positions in one of which said first movable contact bridges said first pair of contacts, means for hiding the position of said first movable contact, a first dial mechanically coupled to said first movable contact for positioning said first movable contact, a second pair of contacts mounted in said base and connected in series with said first pair of contacts, a second movable contact movably mounted on said base and movable to a plurality of positions in one of which said second movable contact bridges said second pair of contacts, said means for also hiding the position of said second movable contact, a second dial mechanically coupled to said second movable contact for positioning said second movable contact, said base including a cylinder, a rotatable assembly mounted for rotation in said cylinder and including, as said means for hiding, an exposed forward cover projecting forwardly out of said cylinder, two pairs of sprockets mounted on said rotatable assembly, one sprocket of each pair of sprockets being positioned forwardly of and in alignment with the other sprocket of each pair of sprockets, a pair of chains each surrounding and meshing with a respective pair of sprockets, each of said chains having unmeshed front-to-rear-extending portions which extend between said sprockets, each of said movable contacts being mounted on a respective one of said chains on one of the front-to-rear-extending portions thereof, each of said dials having a disc-like configuration and having indicia inscribed on the periphery thereof, each of said dials projecting through said cover and being fixed relative to a respective sprocket of said one sprockets.

5. The switch of claim 4 wherein said rotatable assembly includes a pair of front-to-rear-extending rectangular-cross-section guide rods, a pair of contact-carrying carriages each having a rectangular aperture therethrough which is complementry in configuration to a respective guide rod and through which a respective guide rod extends, a pair of contact mounting members each having a respective movable contact fixedly mounted thereon and slidably mounted upon a respective carriage, a pair of springs each acting between a respective one of said contact mounting members and its carriage and urging the movable contact of the respective mounting member against said cylinder.

6. The switch of claim 5 wherein said cylinder has a plurality of inwardly-facing recesses, said contact-mounting members each having a plurality of outwardly-projecting nipples which are adapted to snap into registry with said recesses when each movable contact moves into another of its plurality of positions.

References Cited
UNITED STATES PATENTS

| | | | |
|---|---|---|---|
| 2,295,178 | 9/1942 | Kolias | 340—64 |
| 2,452,747 | 11/1948 | Gomez | 200—43 |
| 2,583,752 | 1/1952 | Smith | 340—64 |
| 2,615,083 | 10/1952 | Krueger | 340—64 |
| 3,192,331 | 6/1965 | Davidson | 200—43 |
| 3,214,531 | 10/1965 | Dux | 200—43 |

ROBERT K. SCHAEFER, *Primary Examiner.*

H. J. HOHAUSER, *Assistant Examiner.*